United States Patent
Naik et al.

(10) Patent No.: US 8,015,392 B2
(45) Date of Patent: Sep. 6, 2011

(54) UPDATING INSTRUCTIONS TO FREE CORE IN MULTI-CORE PROCESSOR WITH CORE SEQUENCE TABLE INDICATING LINKING OF THREAD SEQUENCES FOR PROCESSING QUEUED PACKETS

(75) Inventors: Uday Naik, Fremont, CA (US); Ching Boon Lee, Penang (MY); Ai Bee Lim, Nashua, NH (US); Koji Sahara, Tsuchiura (JP)

(73) Assignee: Intel Corporation, Santa Clara, CA (US)

( * ) Notice: Subject to any disclaimer, the term of this patent is extended or adjusted under 35 U.S.C. 154(b) by 2046 days.

(21) Appl. No.: 10/954,326

(22) Filed: Sep. 29, 2004

(65) Prior Publication Data
US 2006/0070054 A1  Mar. 30, 2006

(51) Int. Cl.
*G06F 9/46* (2006.01)
(52) U.S. Cl. .......................... 712/32; 718/102
(58) Field of Classification Search .................. None
See application file for complete search history.

(56) References Cited

U.S. PATENT DOCUMENTS

| | | | |
|---|---|---|---|
| 5,696,920 A | 12/1997 | Miyata et al. | |
| 6,172,990 B1 | 1/2001 | Deb et al. | |
| 6,959,372 B1 * | 10/2005 | Hobson et al. | 711/168 |
| 2003/0158759 A1 | 8/2003 | Kannenberg | |
| 2005/0022173 A1 * | 1/2005 | Kanade | 717/140 |
| 2006/0069755 A1 * | 3/2006 | Peng | 709/220 |
| 2006/0101257 A1 * | 5/2006 | Sijstermans | 712/248 |
| 2006/0212643 A1 * | 9/2006 | Suzuoki | 711/5 |

FOREIGN PATENT DOCUMENTS

| | | |
|---|---|---|
| CN | 1495618 A | 5/2004 |
| EP | 1 160 666 A2 | 12/2001 |
| WO | WO 0127753 A2 * | 4/2001 |
| WO | 2006039596 A1 | 4/2006 |

OTHER PUBLICATIONS

Intel, IXP1200 Network Processor Family, Hardware Reference Manual, Dec. 2001, Part No. 278303-009, 272 pages.
The Next Generation of Intel IXP Network Processors, Intel Technology Journal, vol. 06, Issue 03, Aug. 15, 2002, ISSN 1535766X, pp. 6-18 (20 pages).

(Continued)

*Primary Examiner* — Kenneth S Kim
(74) *Attorney, Agent, or Firm* — Grossman, Tucker, Perreault & Pfleger, PLLC

(57) ABSTRACT

A method of updating execution instructions of a multi-core processor comprising receiving execution instructions at a processor including multiple programmable processing cores integrated on a single die, selecting subset of at least one of the cores, and loading at least a portion of the execution instructions to the subset of cores and replacing existing execution instructions, associated with the first subset of programmable processing cores, with the received execution instructions while at least one of the other cores continues to process received packets, wherein a sequence of threads provided by the cores sequentially retrieve packets to process from at least one queue, the sequence proceeding from a subsequence of at least one thread of one core to a subsequence of at least one thread on another core and wherein the sequence of threads is specified by data identifying, at least, the next core in the sequence.

14 Claims, 13 Drawing Sheets

OTHER PUBLICATIONS

Intel, Intel XScale Microarchitecture, Technical Summary 2000, pp. 1-10 (14 pages).
Intel, Intel Network Infrastructure Processors, Extending Intelligence in the Network; White Paper 2002; pp. 1-13 (15 pages).
Intel XScale Core, Developer's Manual; Dec. 2000; Order No. 273473-001; 272 pages.
Kumar, et al: Single-ISA Heterogeneous Multi-Core Architectures for Multithreaded Workload Performance; Proceedings of the.
PCT/US2005/035376 Int'l Search Report & Written Opinion dated Mar. 7, 2006.
Office Action Received for Chinese Patent Application No. 200510129136.3, mailed on Jul. 4, 2008, 13 pages of English Translation and 8 pages of Office Action.
Office Action Received for Chinese Patent Application No. 200510129136.3, mailed on Jan. 15, 2010, 14 pages of English Translation and 8 pages of Office Action.
International Preliminary Report on Patentability for PCT Patent Application No. PCT/US2005/035376, Mailed Apr. 12, 2007, 8 Pages.
Intel, Internet Exchange Architecture Software Developers Kit 2.0 for the IXP1200 Network Processor, 2001, 6 Pages.
Tennenhouse et al., "A Survey of Active Network Research", IEEE Communications Magazine, vol. 35, 1997, pp. 1-14.
Kumar, et al: Single-ISA Heterogeneous Multi-Core Architectures for Multithreaded Workload Performance; Proceedings of the 31st Annual International Symposium on Computer Architecture (ISCA '04) 2004 IEEE.

* cited by examiner

UPDATING INSTRUCTIONS TO FREE CORE IN MULTI-CORE PROCESSOR WITH CORE SEQUENCE TABLE INDICATING LINKING OF THREAD SEQUENCES FOR PROCESSING QUEUED PACKETS

REFERENCE TO RELATED APPLICATIONS

This relates to pending U.S. patent application Ser. No. 10/279,590, filed Oct. 23, 2002, entitled "PROCESSOR PROGRAMMING", and naming DAVID PUTZOLU, AARON KUNZE, and ERIK JOHNSON as inventors.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network forwarding devices (e.g., "routers", "bridges" and/or "switches") before reaching its destination. These intermediate devices often perform a variety of packet processing operations. For example, intermediate devices often perform packet classification to determine how to forward a packet further toward its destination or to determine the quality of service to provide.

These intermediate devices are carefully designed to keep apace the increasing deluge of traffic traveling across networks. Some architectures implement packet processing using "hard-wired" logic such as Application Specific Integrated Circuits (ASICs). While ASICs can operate at high speeds, changing ASIC operation, for example, to adapt to a change in a network protocol can prove difficult.

Other architectures use programmable devices known as network processors. Network processors enable software programmers to quickly reprogram network processor operations. Some network processors feature multiple processing cores to amass packet processing computational power. These cores may operate on packets in parallel. For instance, while one core determines how to forward one packet further toward its destination, a different core determines how to forward another. This enables the network processors to achieve speeds rivaling ASICs while remaining programmable.

DETAILED DESCRIPTION

The programmable nature of a network processor allows network operators to alter operation by changing the instructions executed. This can extend the "time in market" of a device including a network processor. That is, a network processor can be reprogrammed instead of being replaced. However, temporarily taking a network device off-line for reprogramming may disrupt existing services and, potentially, result in a large volume of dropped packets. Described herein are techniques that permit network processor reprogramming without significant disruption of existing services or a large volume of dropped packets. That is, the network processor can continue its role in a packet forwarding system while a software upgrade proceeds.

Figure 1A:
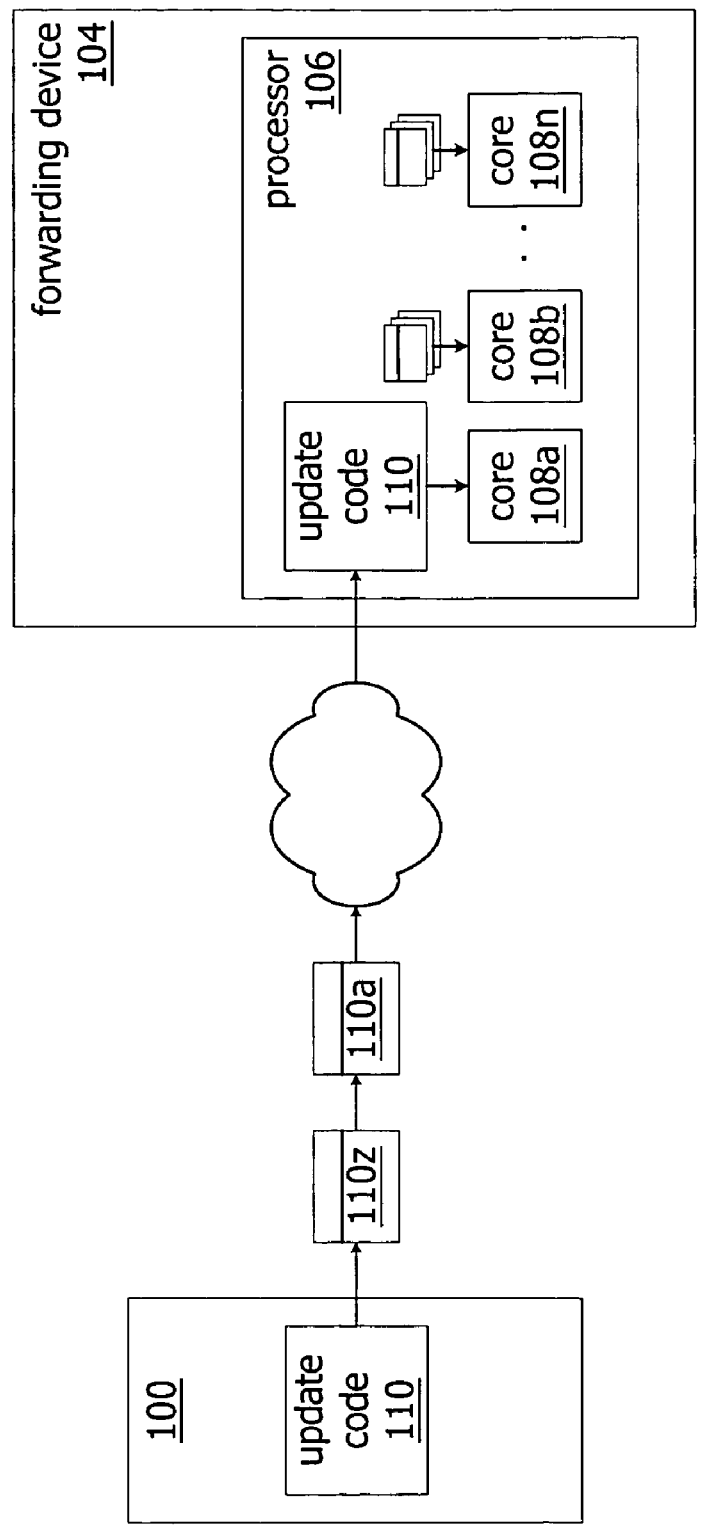
FIGS. 1A-1C are diagrams illustrating updating of network processor software.
Figure 1B:
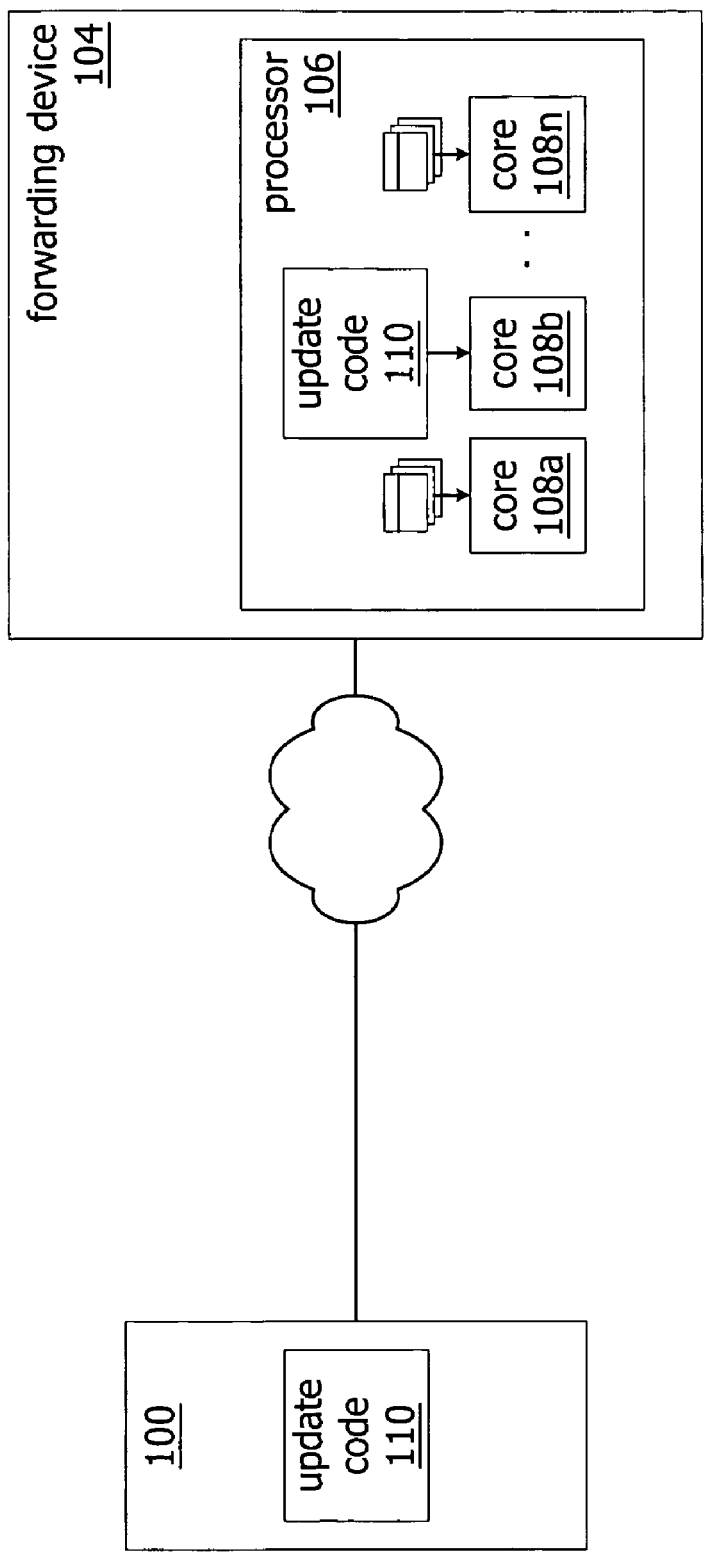
Figure 1C:
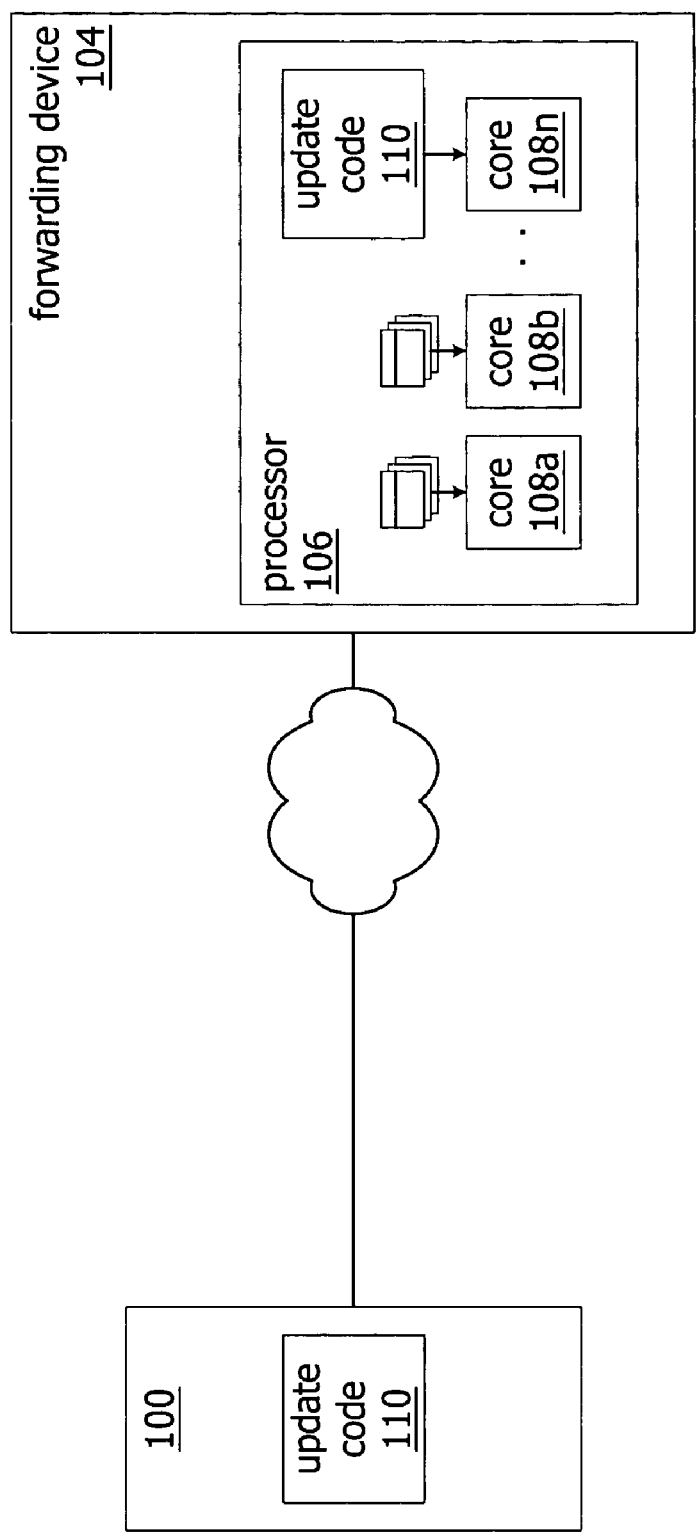

As an example, FIGS. 1A-1C illustrate remote updating of a deployed network forwarding device 104 (e.g., a router or switch) incorporating a network processor 106. As shown, the network processor 106 includes multiple programmable processing cores 108a-108n. To update the instructions executed by these cores 108a-108n, a remote device 100 transmits update instructions 110 within a series of packets 110a-110z. The processor 106 (or other entity) can extract these packets from network traffic and reassemble the update instructions 110.

As shown in FIGS. 1A-1C, the processor 106 can temporarily free one of the cores 108a-108n from packet processing operations, update the core's software, reactivate the core, and repeat this process on the remaining cores 108a-108n. For example, in FIG. 1A, the processor 106 frees and updates core 108a while cores 108b and 108n continue processing received packets. Likewise, in FIGS. 1B and 1C the processor 106 frees and updates cores 108b and 108n, respectively.

The approach illustrated in FIGS. 1A-1C can be used in a wide variety of hardware and software architectures. For example, FIGS. 3A-3F illustrate a software update for cores implementing a sample packet processing pipeline shown in FIG. 2.

Figure 2:
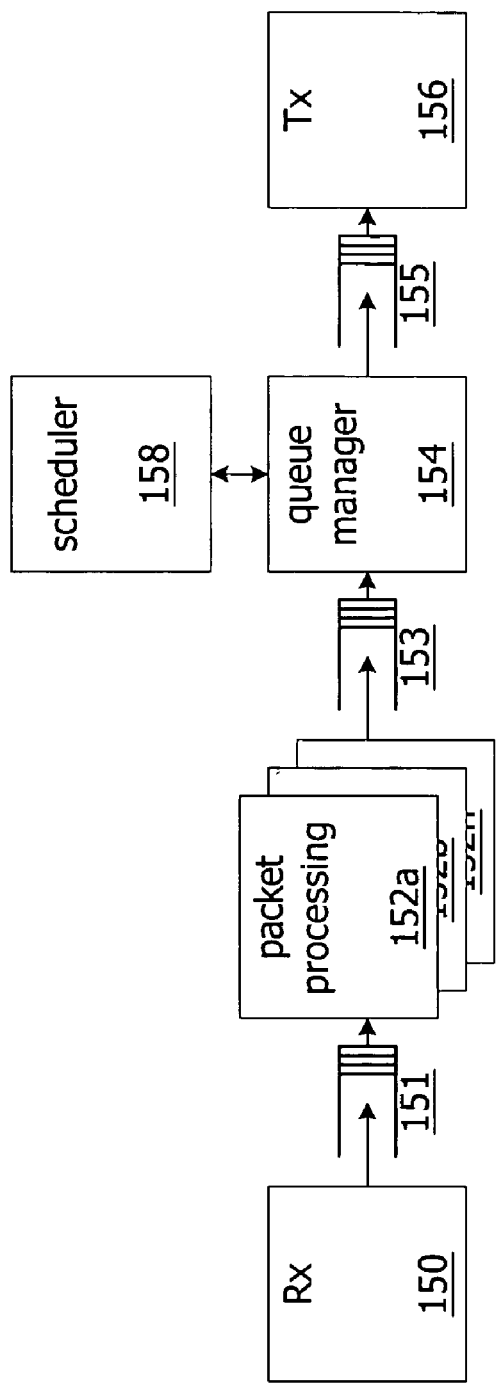
FIG. 2 is a diagram of a sample packet processing architecture.

The sample packet processing pipeline shown in FIG. 2 features a collection of threads 150, 152a-152n, 154, 156, and 158. A thread features an execution context (e.g., program counter, register values, and so forth) that is independent of other threads. A given core 108 may support a single thread or multiple threads that the core 108 swaps between.

As shown, the pipeline includes one or more receive threads 150 that assemble and store a received packet in memory. A receive thread 150 then queues 151 an entry for the packet. A collection of packet processing threads 152a-152n can consume the queue 151 entries and process the corresponding packet. Packet processing can include a wide variety of operations such as a variety of table lookups (e.g., a LPM (Longest Prefix Matching) lookup in a routing table), application of Quality of Service (QoS), altering packet contents (e.g., changing the Media Access Control (MAC) destination address of the packet to that of the next hop), and so forth. The threads 152 may also selectively drop packets in response to overwhelming traffic demands, for example, using a type of Random Early Detect (RED).

After performing their operations, the packet processing threads 152 queue 153 entries for the packets for a queue manager 154. The queue manager 154 sorts the entries into a set of egress queues (not shown), for example, where a given egress queue represents an outbound interface the packet will be forwarded through. A scheduler 158 thread selects egress queues to service, for example, based on a round-robin, priority, or other scheme. The queue manager 154 forwards packet entries from the egress queues selected by the scheduler 158 for service to a transmit thread 156 that handles transmission of the packet to the identified egress interface, for example, via a switch fabric.

The threads 150-158 may be distributed across the cores in a variety of ways. For example, one core 108*a* may execute a collection of receive threads 150 while a different core 108*b* may solely execute transmit threads 156. Alternately, different types of threads may execute on the same core 108. For example, a core 108*c* may execute both scheduler 158 and queue manager 154 threads.

As described above, a network processor can be reprogrammed by changing the instructions executed by the cores. For example, the packet processing threads 152 may be revised to provide new services, reflect changed or new protocols, or take advantage of newer implementations. As illustrated in FIGS. 3A-3F, a processor 106 can perform an "on-the-fly" software update by temporarily "off-loading" packet processing operations of a given core, update the core's code, and then resuming packet processing operations at the updated core. As illustrated in FIGS. 3A-3F this may be an iterative process that repeats as each core providing threads is updated.

In the sample software architecture shown in FIGS. 3A-3F, threads 112 maintain packet order (packets are transmitted in the order received) by processing received packets in turn in a lock-stepped ordered sequence. In the implementation shown, the lock-step sequence is maintained by a signaling scheme where each thread 112 awaits a signal from a previous thread before completing operations on a packet. For example, as shown, thread 112*a* will dequeue and operate on packet 114*a* while thread 112*b* awaits a signal from thread 112*a* before it proceeds with operations on the next queued packet 114*b*. As shown, the thread sequence can travel across multiple cores 108*a*-108*b*.

Signaling between threads within the same core 108 can be performed in a variety of ways (e.g., by setting flags within a shared control and status register (CSR) or other shared memory). Signaling across cores 108 may also be performed in a variety of ways such as using a hardware inter-core signaling mechanism (described below).

Figure 3A:
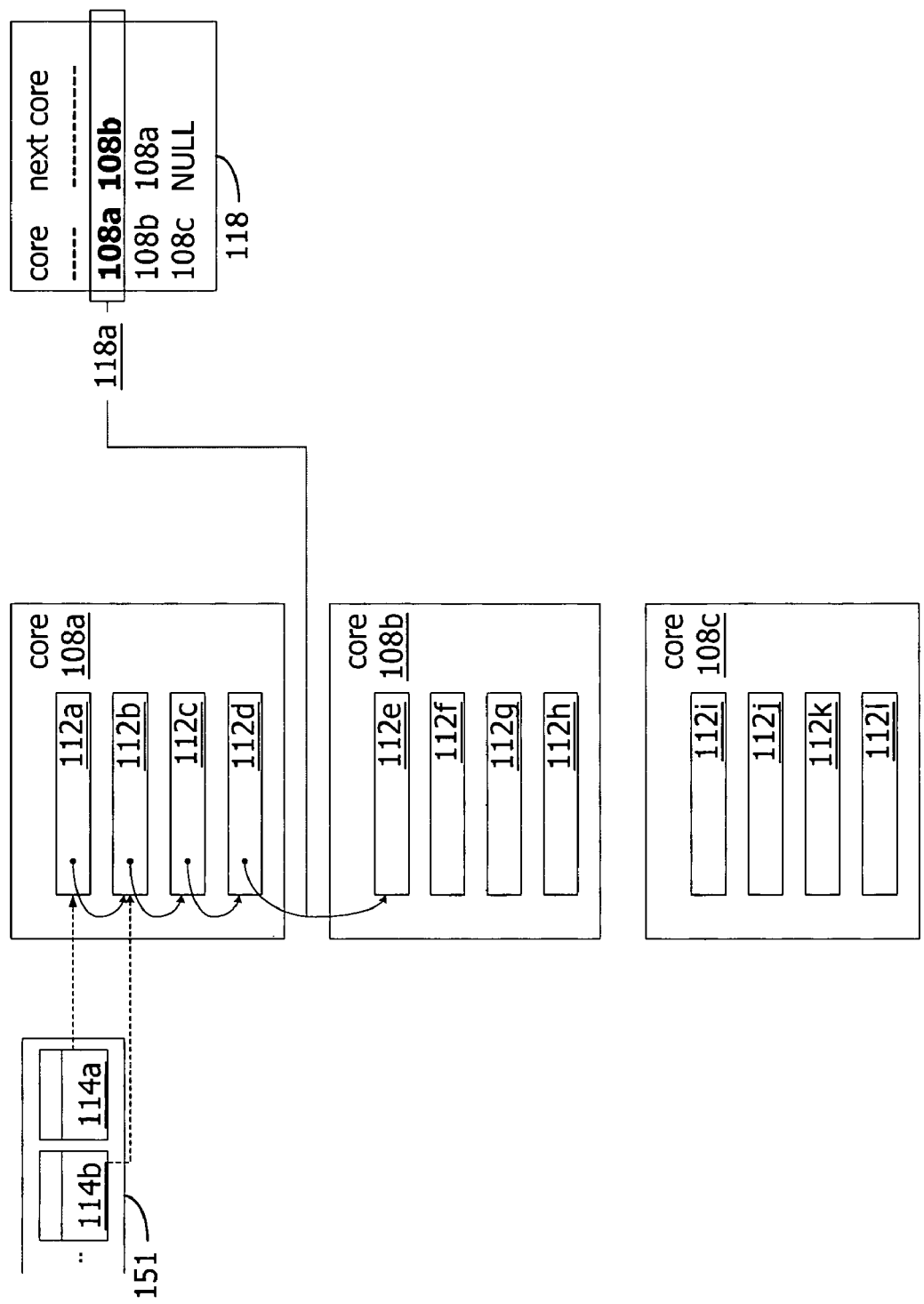
FIGS. 3A-3F are diagrams illustrating updating of instructions executed by a processor's cores.
Figure 3B:
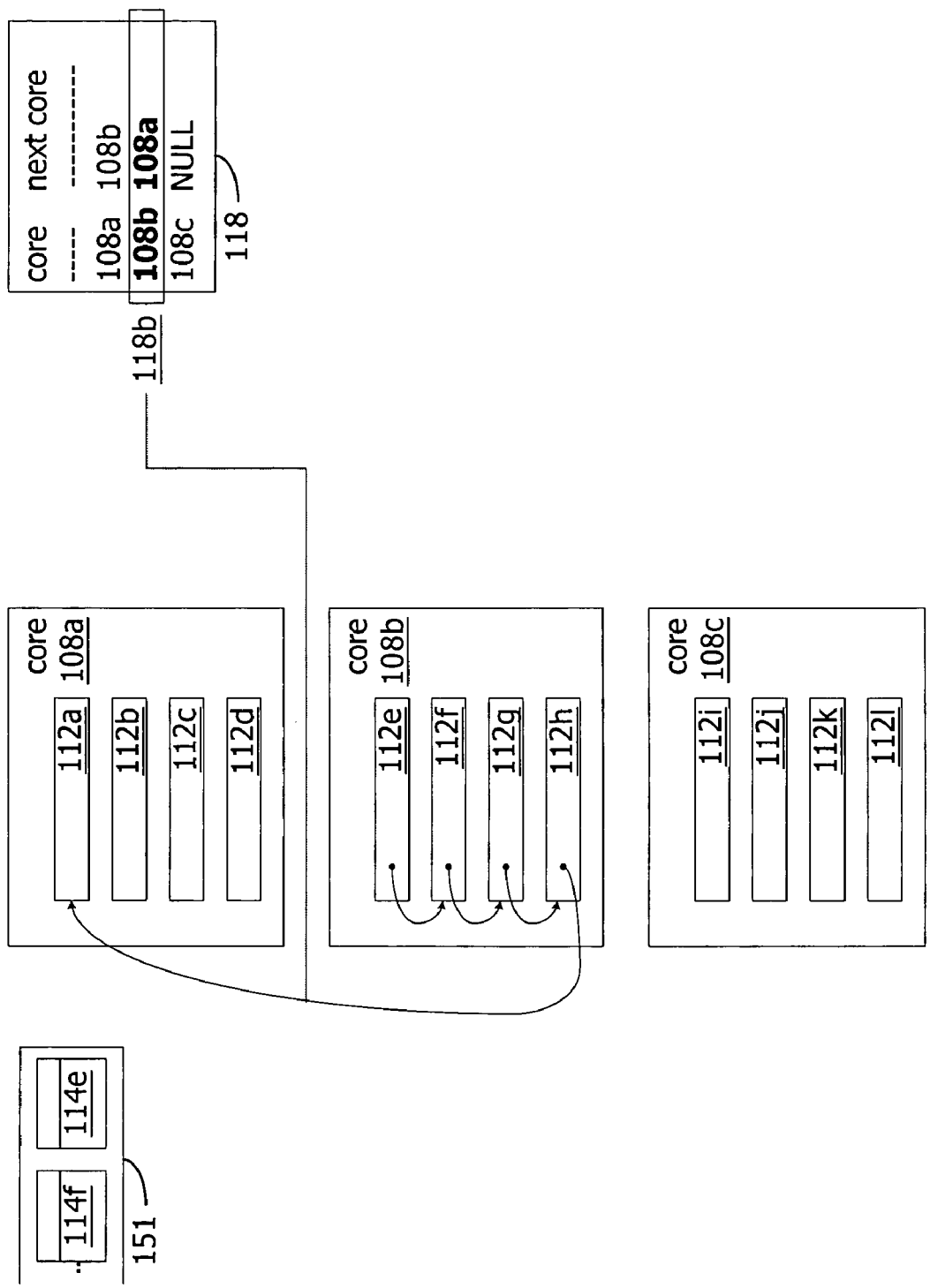

As shown in FIG. 3A, the sequence of cores 108*a*-108*c* used in the thread sequence may be determined by data 118 instead of hard-coded. For example, a table 118 may indicate the next core to signal (e.g., the next core providing the next thread in the thread sequence). For instance, the last thread in a core can read table 118 to determine the next core to signal. For instance, as shown, thread 112*d* can access table 118, lookup the thread's 112*d* core's 108*a* identifier ("108*a*") in the table, and, based on the lookup results 118*a*, signal the next core 108*b* to process the next enqueued 151 packet. As shown in FIG. 3B, the thread sequence continues within core 108*b*. As shown, a table lookup 118*b* by the last thread 112*h* in core 108*b* "wraps" the thread sequence back to core 108*a*.

Figure 3C:
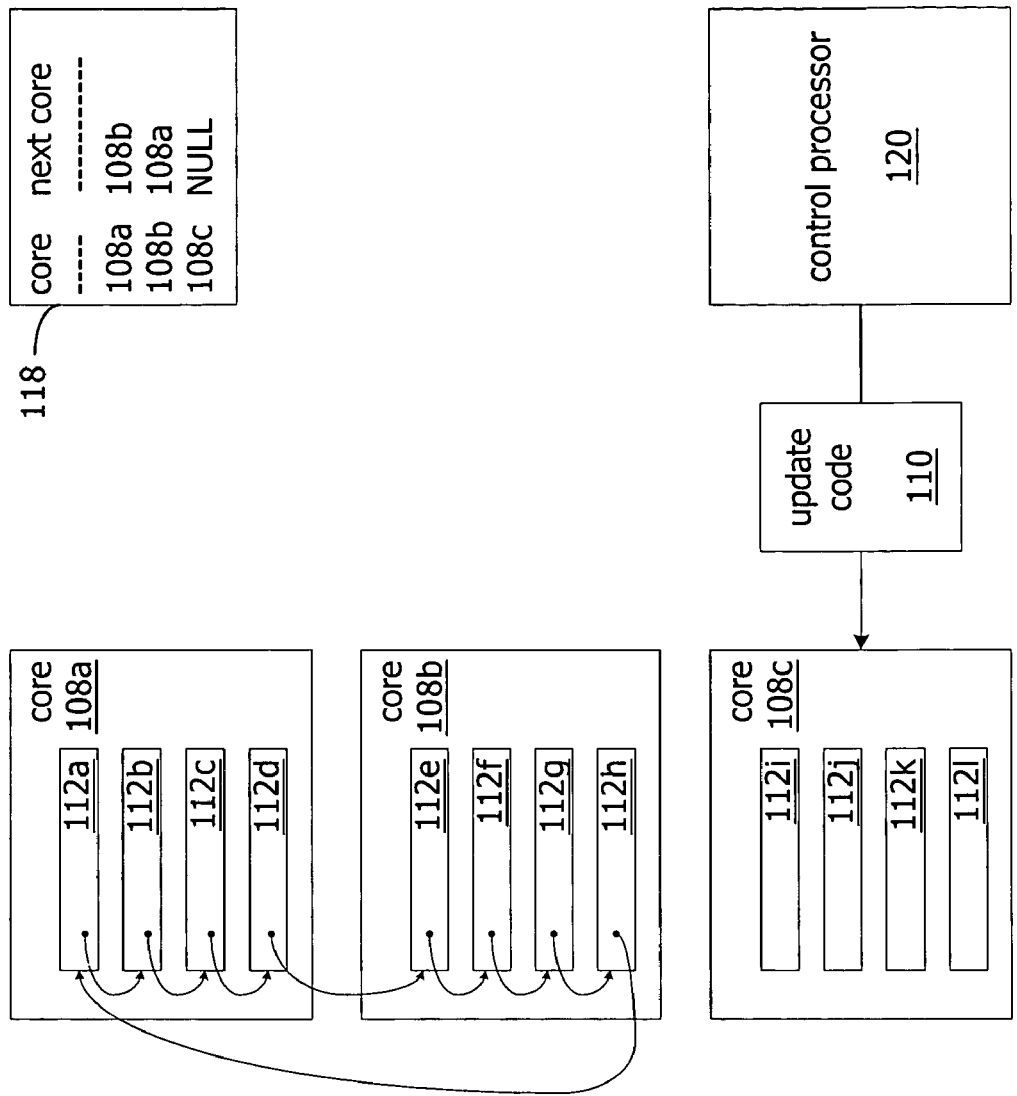
Figure 3D:
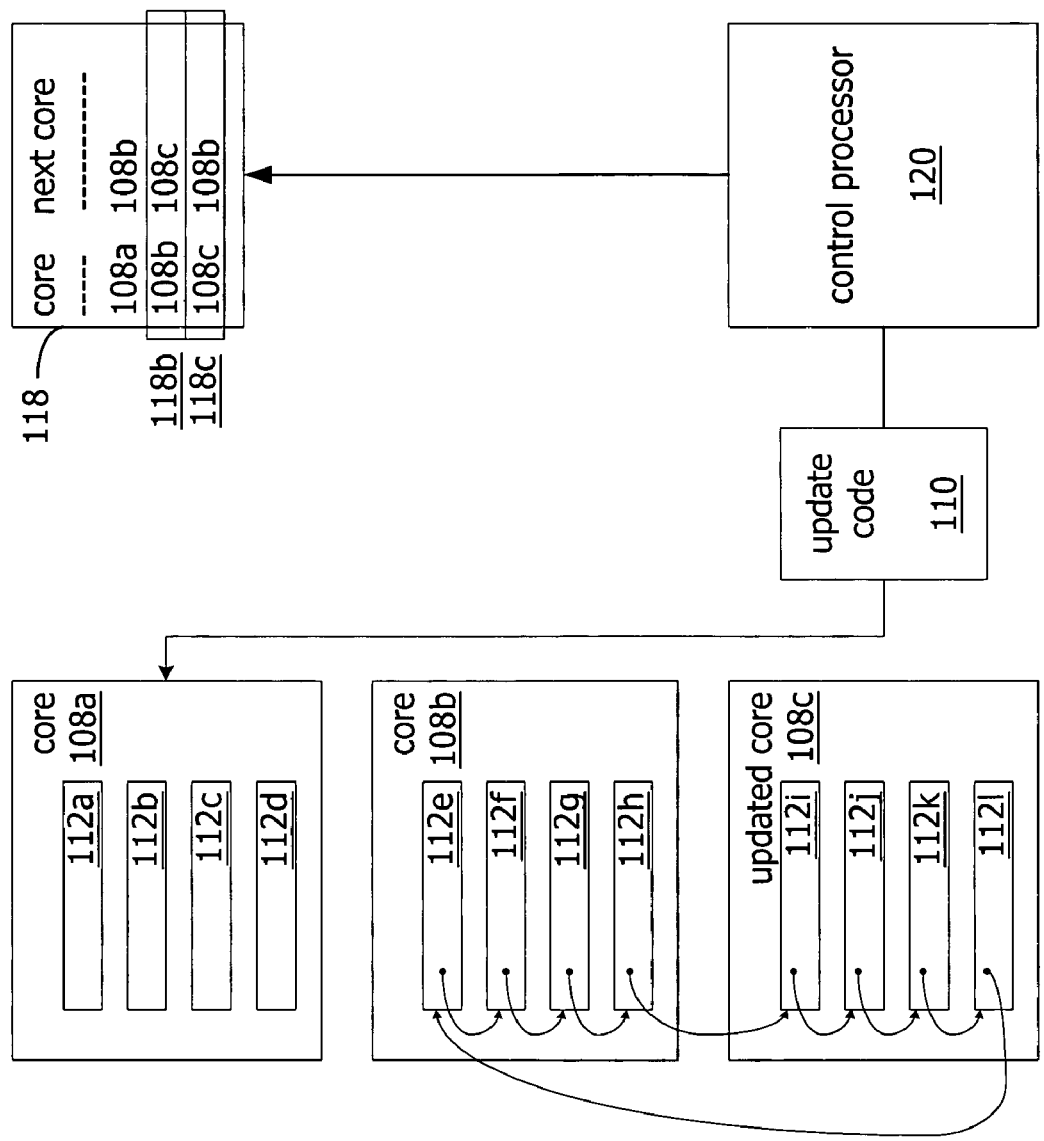
Figure 3E:
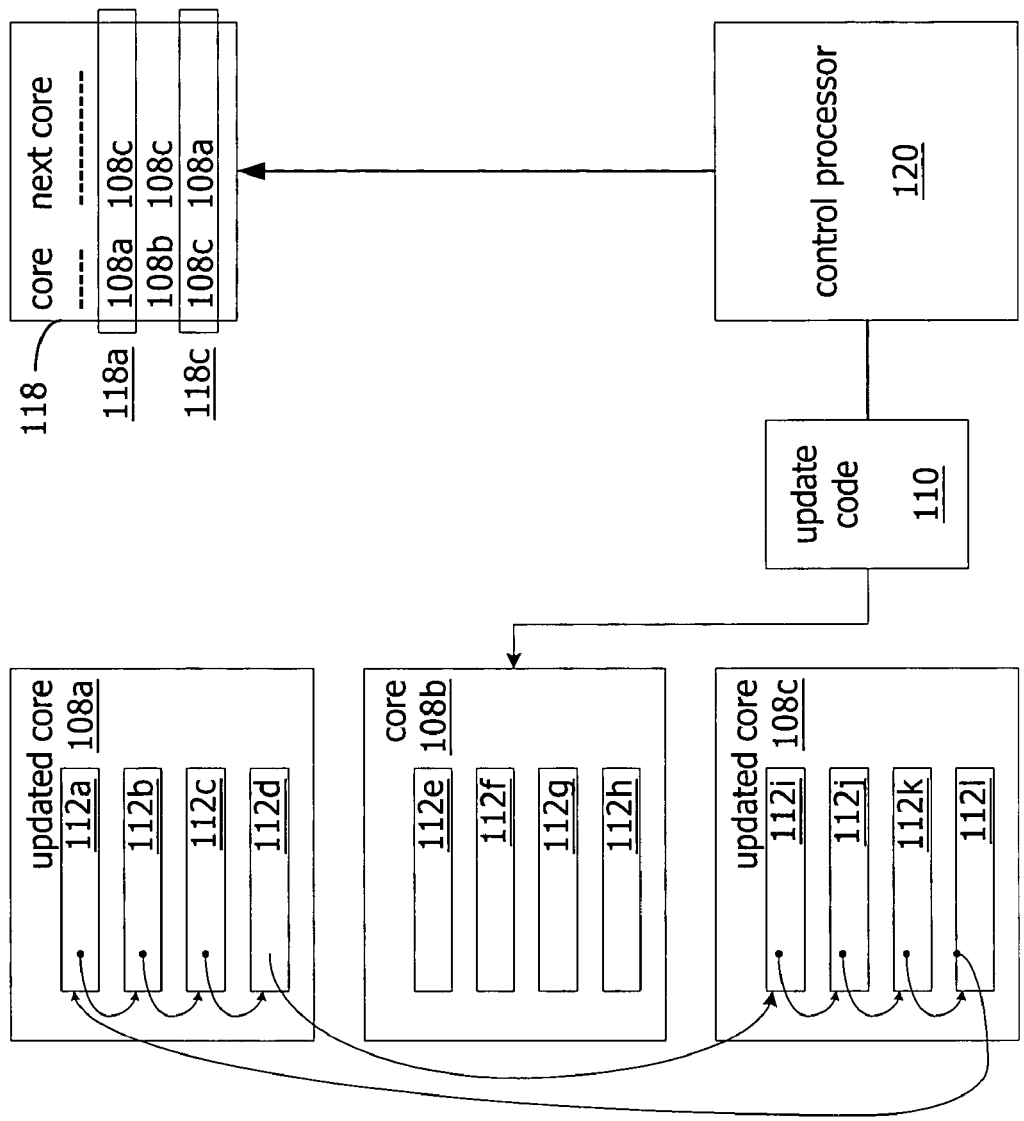

In FIGS. 3A and 3B core 108*c* was free of packet processing duties. As shown in FIG. 3C, while core 108*c* is freed, the instructions executed by core 108*c* threads may be updated by a control processor or thread 120 while the threads 112*a*-112*h* of cores 108*a*-108*b* continue packet processing operations.

Figure 3F:
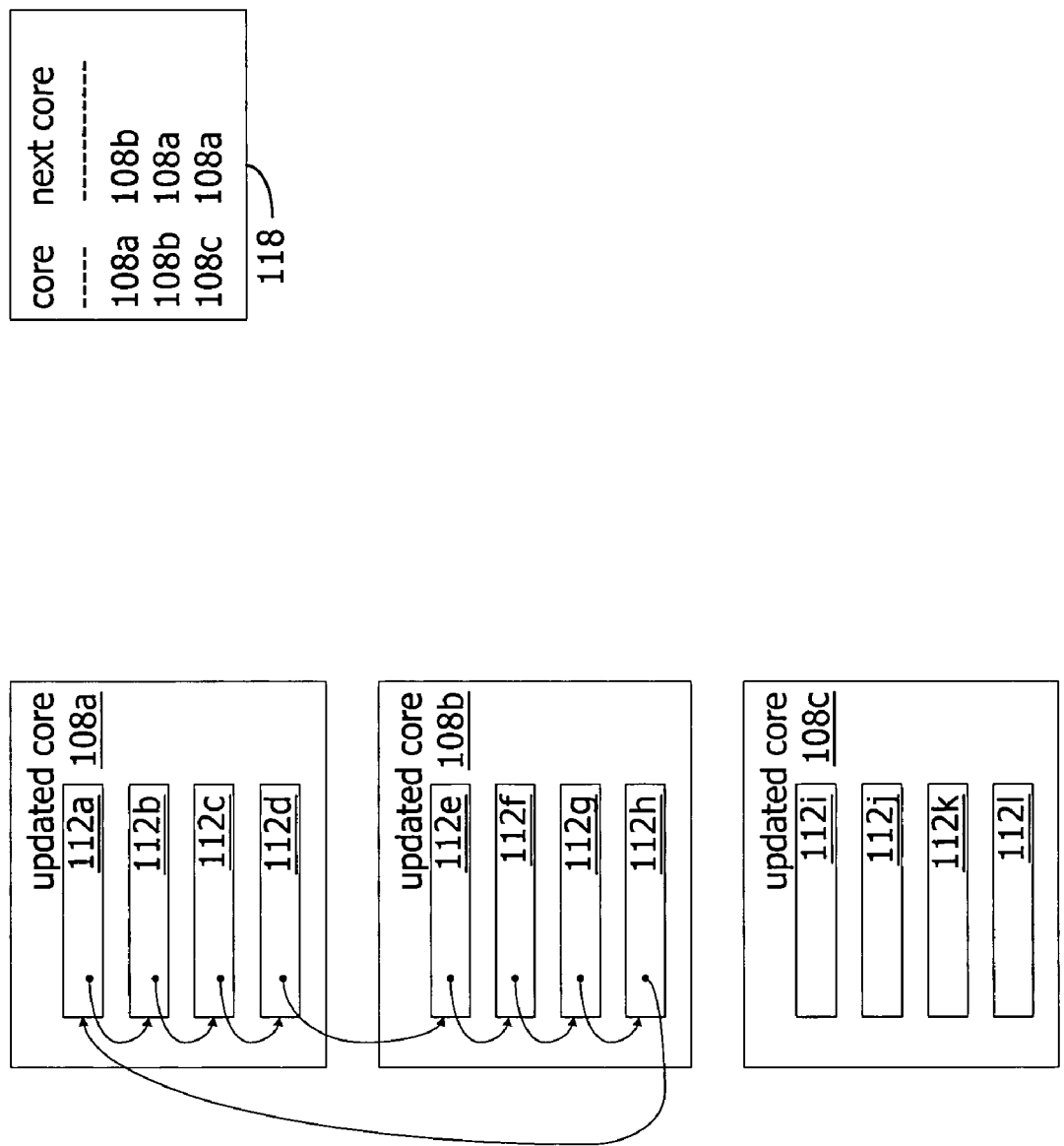

The core sequence provided by table 118 provides flexibility in distributing the thread sequence across different sets of cores. For example, in FIG. 3D, by changing table "links" 118*b* and 118*c* (e.g., by control processor 120), the threads of core 108*a* may be freed of packet processing operations. That is, once removed from the core chain identified by table 118, a core will be freed of packet processing operations once any on-going operations for previously received packets completes. Thereafter, the core 108*a* may receive an "exit" signal from the control processor 120 causing the core 108*a* to flush its cache. Temporarily freeing the core 108*a* of its packet processing duties enables the processor 120 to update the core's 108*a* software 110. Similarly, in FIG. 3E, by changing table "links" 118*a* and 118*c*, the threads of core 108*b* may be removed from the thread sequence, permitting updating of the core 108*b* software 110. Finally, as shown in FIG. 3F, cores 108*a*-108*c* have received the software update 110.

For simplicity of illustration, FIGS. 3A-3F depicted only three cores 108*a*-108*c*, however, this process may repeat for N-cores.

As shown in FIGS. 3A-3F, at times, some cores may execute "legacy" code while others are executing the updated instructions 110. To avoid disruption, the update instructions should be backward compatible and work within the legacy framework at least temporarily. For example, the update instructions 110 should continue to participate in inter-thread signaling used to coordinate access to critical sections (e.g., sets of instructions that temporarily require exclusive access to a shared resource) used in the legacy code until each core runs the updated software 110. Additionally, new critical sections of the updated software 110 should not be started until all participating cores 108 have been updated. For example, the update code may await a signal set by the control processor 120 indicating updating of the cores 108 has completed (e.g., a START_CRITICAL_SECTION flag distributed to or accessed by the cores 108).

The implementation illustrated in FIGS. 3A-3F enabled a core software upgrade to proceed while maintaining the lock-step packet processing scheme used to maintain packet order. However, the core update approach may be used in other architectures. For example, instead of a sequence of threads, a software architecture may use a "pool of threads" approach. In a pool of threads scheme, threads are added and removed from a pool of available threads as they complete or are allocated to processing a packet. That is, instead of lock-step processing, packets are processed by allocated threads as they arrive and packet ordering is enforced by threads later in the pipeline. To update core instructions in a pool of threads implementation, the processor 106 can free a core by removing its threads from the pool of available threads. Once the core's threads are removed, the core software can be updated. After updating, the core's threads are then returned to the thread pool and the process repeats with a different core.

Figure 4:
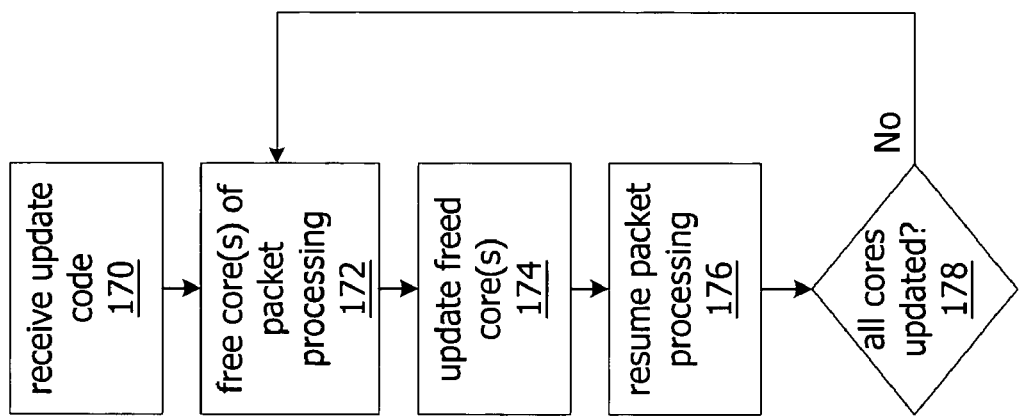
FIG. 4 is a flow chart of a process to update instructions executed by a processor's cores.

FIG. 4 illustrates a process a multi-core processor can implement to update core software. As shown, the processor 106 receives 170 the new software instructions. The instructions may be received from a local device (e.g., via a Peripheral Component Interconnect (PCI) connection to a connected administration device). Alternately, the instructions may be received within control plane packets transmitted to the network processor. Such packets may be Internet Protocol (IP) packets having an Internet Protocol destination address of a network node incorporating the network processor. In addition to the instructions, the packets may identify a particular network processor within the node to update or, potentially, which cores to update (e.g., different cores may receive different software). As shown, the process repeatedly frees 172, updates 174, and resumes packet processing operations 176 of cores in succession. Potentially, the process may operate on subsets of multiple cores instead of individual ones. For example, in the case where multiple cores may share a common control store the process may free and update an entire subset of cores at a time. In either case, packet processing can continue in the other cores.

Many variations of the sample process shown in FIG. 4 may be implemented. For example, potentially, the network processor may be configured to permanently leave one redundant core idle. Alternately, the network processor may free a "scratch" core when an update occurs.

Figure 5:
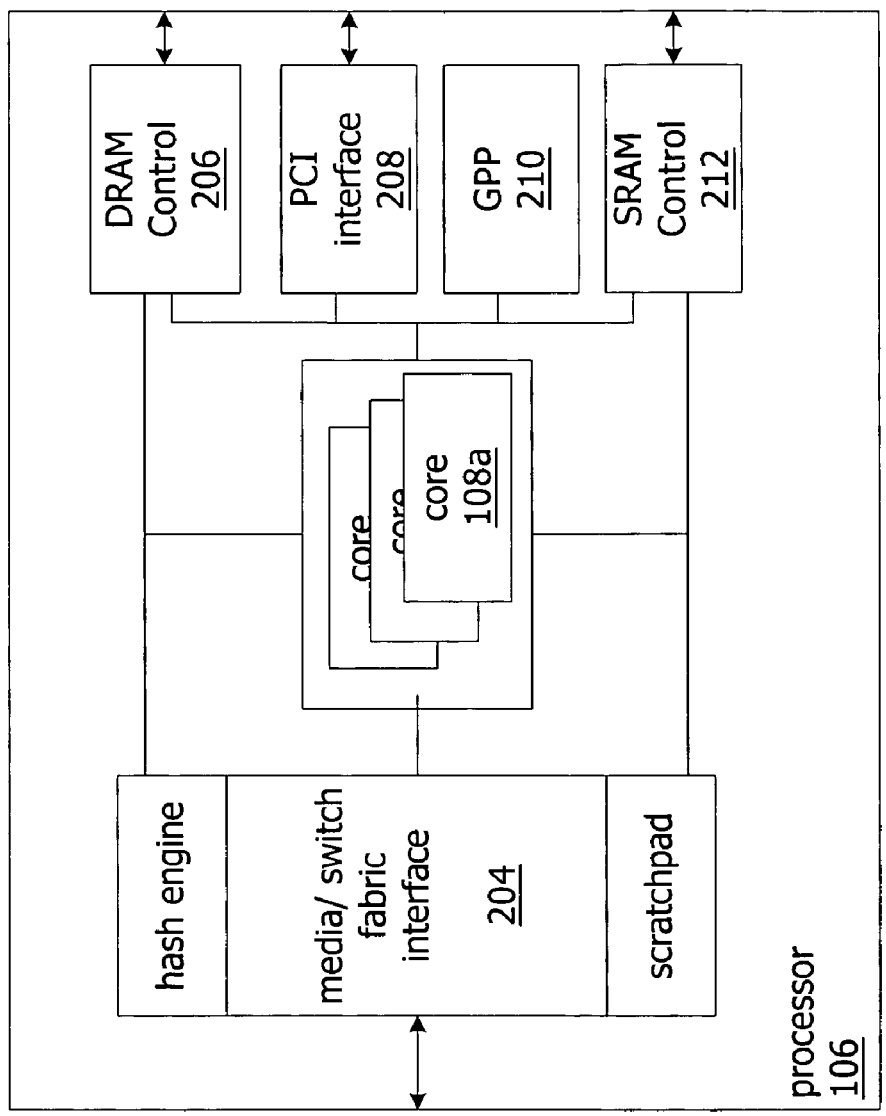
FIG. 5 is a diagram of a sample architecture of a network processor.

The techniques described above may be used in a wide variety of multi-core architectures. For example, FIG. 5 depicts an example of a multi-core network processor 106. The network processor 106 shown is an Intel® Internet Exchange network Processor (IXP). Other network processors feature different designs.

The network processor 106 shown features a collection of processing cores 108 on a single integrated semiconductor die. Each core 108 may be a Reduced Instruction Set Computing (RISC) processor tailored for packet processing. For example, the cores 108 may not provide floating point or integer division instructions commonly provided by the instruction sets of general purpose processors. Individual cores 108 may provide multiple threads of execution. For example, a core 108 may store multiple program counters and other context data for different threads. The cores 108 may communicate with other cores 108 via shared resources (e.g., Synchronous Random Access Memory (SRAM) or Dynamic Random Access Memory (DRAM)). Alternately, the cores 108 may communicate via neighbor registers directly wired to adjacent core(s) 204 or a CAP (CSR Access Proxy) that can route signals to non-adjacent cores.

As shown, the network processor 106 also features at least one interface 204 that can carry packets between the processor 106 and other network components. For example, the processor 106 can feature a switch fabric interface 204 (e.g., a Common Switch Interface (CSIX)) that enables the processor 106 to transmit a packet to other processor(s) or circuitry connected to the fabric. The processor 106 can also feature an interface 204 (e.g., a System Packet Interface (SPI) interface) that enables the processor 106 to communicate with physical layer (PHY) and/or link layer devices (e.g., Media Access Controller (MAC) or framer devices). The processor 106 also includes an interface 208 (e.g., a PCI bus interface) for communicating, for example, with a host or other network processors.

As shown, the processor 106 also includes other components shared by the cores 108 such as a hash engine, internal scratchpad memory and memory controllers 206, 212 that provide access to external shared memory. The network processor 106 also includes a general purpose processor 210 (e.g., a StrongARM® XScale®) that is often programmed to perform "control plane" tasks involved in network operations. The general purpose processor 210, however, may also handle "data plane" tasks.

The general purpose processor 210 can handle the task of updating the cores' software (e.g., act as the control processor 120 in FIGS. 3A-3F). For example, the general purpose processor 210 can extract the update instructions from control plane packets and download the update instructions to the core control store(s). Potentially, each core may have its own control store. Alternately, multiple cores 108 may share a common control store. The general purpose processor 210 may perform other tasks. For example, in a scheme such as the one depicted in FIGS. 3A-3F, the general purpose processor may maintain and adjust the core sequence table 118 to remove and insert cores from/into packet processing operations. Such a table 118 may be stored in SRAM (Synchronous Random Access Memory) accessed by the network processor 106. While described as being performed by the general purpose processor 210, it is not a requirement that the general purpose processor 210 perform these operations. For example, these tasks may be performed by a core 108 or an external agent.

Figure 6:
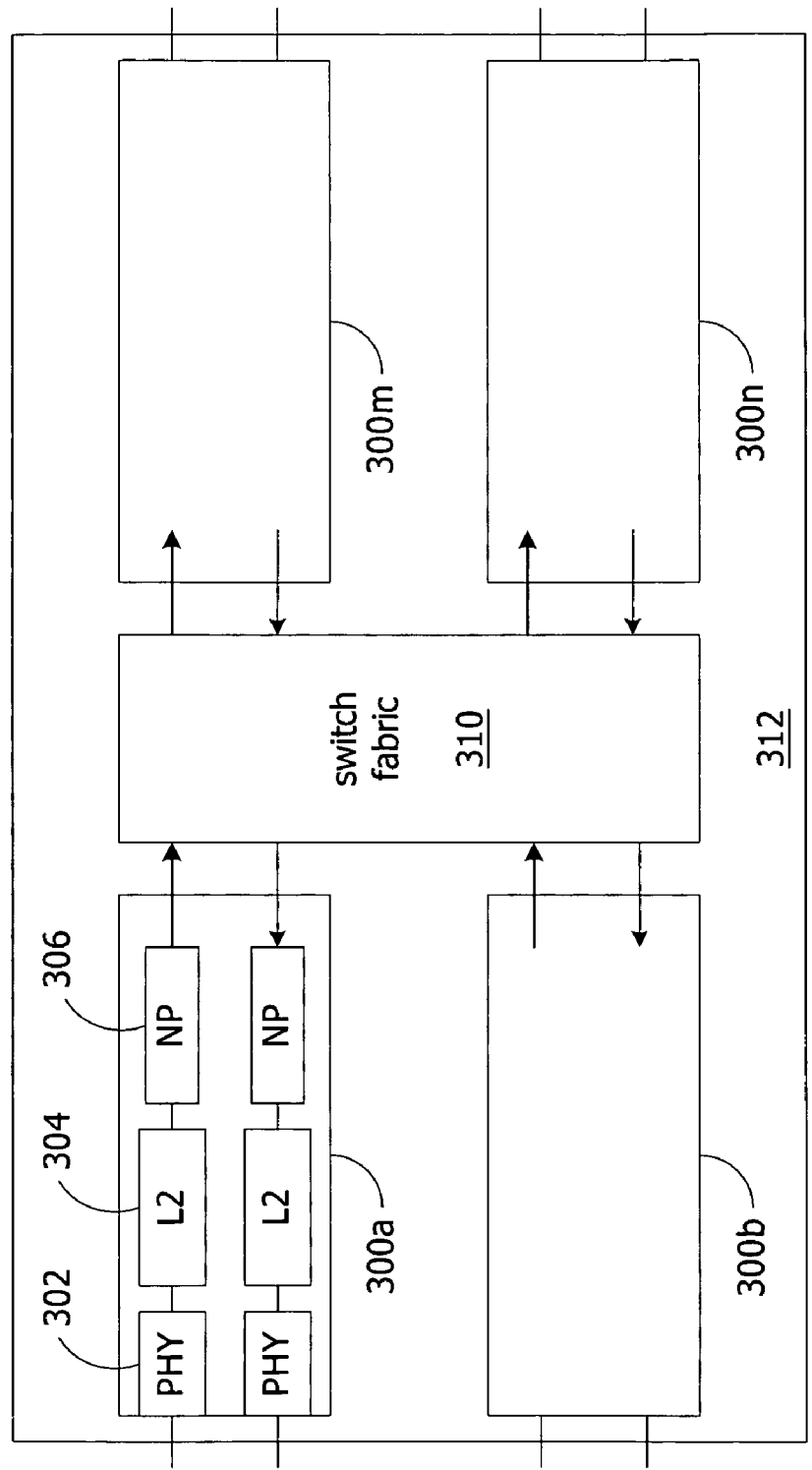
FIG. 6 is a diagram of a sample architecture of a network forwarding device.

FIG. 6 depicts a network forwarding device that can use the core update approach described above. As shown, the device features a collection of line cards 300 ("blades") interconnected by a switch fabric 310 (e.g., a crossbar or shared memory switch fabric). The switch fabric, for example, may conform to CSIX or other fabric technologies such as Hyper-Transport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown may also include one or more network processors 306 that perform packet processing operations for packets received via the PHY(s) 302 and direct the packets, via the switch fabric 310, to a line card providing an egress interface to forward the packet. Potentially, the network processor(s) 306 may perform "layer 2" duties instead of the framer devices 304.

While FIGS. 5 and 6 described specific examples of a network processor and a device incorporating network processors, the techniques may be implemented in a variety of architectures including processors and network devices having designs other than those shown. Additionally, the techniques may be used in a wide variety of network devices (e.g., a router, switch, bridge, hub, traffic generator, and so forth). The term packet can apply to IP (Internet Protocol) datagrams, TCP (Transmission Control Protocol) segments, ATM (Asynchronous Transfer Mode) cells, Ethernet frames, among other protocol data units.

The techniques may be implemented in hardware, software, or a combination of the two. Preferably, the techniques are implemented in computer programs such as a high level procedural or object oriented programming language. The program(s) can be implemented in assembly or machine language if desired. The language may be compiled or interpreted.

Other embodiments are within the scope of the following claims.

What is claimed is:

1. A method of updating execution instructions of a multi-core processor, comprising:
receiving execution instructions at a processor including multiple programmable processing cores integrated on a single die;
selecting a first subset of at least one of the programmable processing cores; and
loading at least a portion of the execution instructions to the first subset of programmable processing cores and replacing existing execution instructions, associated with the first subset of programmable processing cores, with the received execution instructions while at least one of the programmable processing cores not in the first subset continues to process received packets;

wherein a sequence of threads provided by the cores sequentially retrieve packets to process from at least one queue, the sequence proceeding from a subsequence of at least one thread of one core to a subsequence of at least one thread on another core; and wherein the sequence of threads is specified by data identifying, at least, the next core in the sequence.

2. The method of claim 1, further comprising:

selecting a second subset of at least one of the programmable processing cores; and loading the execution instructions to the second subset of programmable processing cores while at least one programmable processing core not in the second subset continues to process received packets.

3. The method of claim 1, further comprising ceasing ongoing packet processing operations in the selected first subset of programmable processing cores before the loading.

4. The method of claim 1, wherein the programmable processing cores are configured to process multiple packet processing threads; and wherein a one of the packet processing threads is allocated from a pool of threads to perform operations for a packet; and further comprising removing threads of programmable processing cores in the first subset from the pool of threads.

5. The method of claim 1, wherein the receiving execution instructions comprises receiving Internet Protocol packets having an Internet Protocol destination address of a network node incorporating the programmable processing cores and having a payload including the execution instructions.

6. A method of updating execution instructions of a multi-core processor, comprising:

an iterative process of:

freeing one programmable processing core of a set of multiple programmable processing cores integrated on a single die from packet processing operations;

replacing an existing execution instructions of the one programmable processing core with new execution instructions while at least one of the other programmable processing cores continues to process received packets;

maintaining data identifying a core sequence, wherein the freeing one programmable processing core comprises removing the core from the core sequence before the updating; and inserting the core into the core sequence after the updating;

whereby a sequence of threads provided by the cores can sequentially retrieve packets to process from at least one queue, the sequence proceeding from a subsequence of at least one thread of one core to a subsequence of at least one thread on another core; and wherein the sequence of threads is specified by the data identifying the core sequence.

7. The method of claim 6, further comprising:

setting a data value after the iterative process completes, said data value representative of the core sequence.

8. A computer program product for updating execution instructions of a multi-core processor, said program disposed on a computer readable medium and including instructions for causing a processor to perform operations comprising:

receiving Internet Protocol packets at a processor including multiple programmable processing cores integrated on a single die;

selecting a first subset of at least one of the programmable processing cores; and loading at least a portion of the execution instructions to the first subset of programmable processing cores and replacing existing execution instructions, associated with the first subset of programmable processing cores, with the received execution instructions while at least one of the programmable processing cores not in the first subset continues to process received packets;

wherein a sequence of threads provided by the cores sequentially retrieve packets to process from at least one queue, the sequence proceeding from a subsequence of at least one thread of one core to a subsequence of at least one thread on another core; and wherein the sequence of threads is specified by data identifying, at least, the next core in the sequence.

9. The computer program of claim 8, wherein the operations further comprise:

selecting a second subset of at least one of the programmable processing cores; and loading the execution instructions to the second subset of programmable processing cores while at least one programmable processing core not in the second subset continues to process received packets.

10. The computer program of claim 8, wherein the operations further comprise freeing the selected first subset of programmable processing cores from processing packets before the loading.

11. The computer program of claim 8, wherein wherein the programmable processing cores are configured to process multiple packet processing threads; and wherein a one of the threads to process a packet is allocated from a pool of threads; and wherein the operations further comprise removing threads of programmable processing cores in the first subset from the pool of threads.

12. The computer program of claim 8, wherein the receiving execution instructions comprises receiving Internet Protocol packets having an Internet Protocol destination address of a network node incorporating the programmable processing cores and having a payload including the execution instructions.

13. A computer program product for updating execution instructions of a multi-core processor, said program disposed on a computer readable medium and including instructions for causing a processor to perform operations comprising an iterative process of:

freeing one programmable processing core of a set of multiple programmable processing cores integrated on a single die from packet processing operations;

replacing an existing execution instructions of the one programmable processing core with new execution instructions while at least one of the other programmable processing cores continues to process received packets;

maintaining data identifying a core sequence, wherein the freeing one programmable processing core comprises removing the core from the core sequence before the updating; and inserting the core into the core sequence after the updating;

whereby a sequence of threads provided by the cores can sequentially retrieve packets to process from at least one queue, the sequence proceeding from a subsequence of at least one thread of one core to a subsequence of at least one thread on another core; and wherein the sequence of threads is specified by the data identifying the core sequence.

14. The computer program of claim 13, wherein the operations further comprise:

setting a data value after the iterative process completes, said data value representative of the core sequence.

* * * * *